United States Patent
Shon (10) Patent No.: US 10,298,723 B2
(45) Date of Patent: May 21, 2019

(54) PROTOCOL CONVERTER

(71) Applicant: LSIS CO., LTD., Anyang-si, Gyeonggi-do (KR)

(72) Inventor: Sang Ki Shon, Hwaseong-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 169 days.

(21) Appl. No.: 14/861,955

(22) Filed: Sep. 22, 2015

(65) Prior Publication Data

US 2016/0100039 A1    Apr. 7, 2016

(30) Foreign Application Priority Data

Oct. 1, 2014    (KR) ........................ 10-2014-0132601

(51) Int. Cl.
*H04L 29/06* (2006.01)
*H04L 12/28* (2006.01)

(52) U.S. Cl.
CPC .......... *H04L 69/08* (2013.01); *H04L 12/2803* (2013.01)

(58) Field of Classification Search
None
See application file for complete search history.

(56) References Cited

U.S. PATENT DOCUMENTS

| 6,070,196 A | 5/2000 | Mullen, Jr. |
| 2006/0067209 A1 | 3/2006 | Sheehan et al. |
| 2007/0124662 A1* | 5/2007 | Streuter ................. G06Q 30/02 715/206 |
| 2012/0185622 A1* | 7/2012 | Capomaggio ......... G06F 13/387 710/62 |
| 2013/0091308 A1 | 4/2013 | Cha et al. |

FOREIGN PATENT DOCUMENTS

| JP | 2009217671 | 9/2009 |
| JP | 2013013083 | 1/2013 |
| JP | 2014050155 | 3/2014 |
| KR | 10-0628493 | 9/2006 |
| WO | 2014103026 | 7/2014 |
| WO | 2014111987 | 7/2014 |

OTHER PUBLICATIONS

European Patent Office Application Serial No. 15187011.0, Search Report dated Feb. 23, 2016, 12 pages.
Japan Patent Office Application Serial No. 2015-195870, Office Action dated Sep. 13, 2016, 3 pages.

* cited by examiner

*Primary Examiner* — Chi H Pham
*Assistant Examiner* — Raul Rivas
(74) *Attorney, Agent, or Firm* — K&L Gates LLP

(57) ABSTRACT

The disclosure relates to a protocol converter that converts between a Modbus protocol and an ECHONET Lite protocol to enable communication between a device performing communication based on a Modbus protocol and a device performing communication based on an ECHONET Lite protocol. The protocol converter according to the disclosure comprises a first communicator connected to a first device that performs communication in a first protocol, a second communicator connected to a second device that performs communication in a second protocol, and a controller that converts the first protocol and the second protocol with each other to control communication between the first device and the second device.

2 Claims, 4 Drawing Sheets

PROTOCOL CONVERTER

CROSS-REFERENCE TO RELATED APPLICATION

Pursuant to 35 U.S.C. § 119(a), this application claims the benefit of earlier filing date and right of priority to Korean Application No. 10-2014-0132601, filed on Oct. 1, 2014, the contents of which is incorporated by reference herein in its entirety.

BACKGROUND OF THE DISCLOSURE

1. Field of the Disclosure

The present disclosure relates to a protocol converter, and particularly to the protocol converter that converts a Modbus protocol and an ECHONET Lite protocol with each other to enable communication between a device performing communication based on a Modbus protocol and a device performing communication based on an ECHONET Lite protocol.

2. Background of the Disclosure

Exemplary embodiments disclosed in the present invention are based on an ECHONET Lite protocol that is attracting much attention as a smart home communication protocol recently.

As an environmental problem, an energy problem, and/or the like come to the fore, the demand for a green energy system is increasing explosively. The reason that provision of the green energy system is slow is because protocols of devices differ. In order to solve such a problem, an ECHONET Lite protocol is being actively developed and distributed all over the world.

However, it is difficult to apply the ECHONET Lite protocol to devices which have been developed and are being used at present. Particularly, since industrial products mainly use a Modbus protocol based on RS 485, it is more difficult for the industrial products to communicate with and be compatible with devices using the ECHONET Lite protocol.

Figure 1:
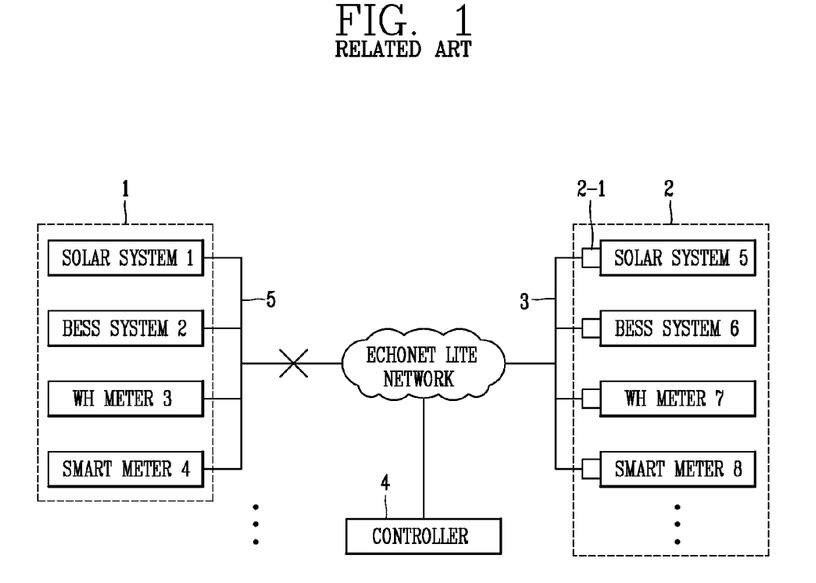
FIG. 1 is a block diagram illustrating a configuration of a related art system including devices which are connected to each other over a communication network.

FIG. 1 is a block diagram illustrating a configuration of a related art system including devices which are connected to each other over a communication network.

In FIG. 1, reference numeral 1 designates industrial devices or electric power generation devices such as a photovoltaic device, an energy storage device, an electricity meter, an electric car charger, and the like which are not based on ECHONET Lite, reference numeral 2 designates a new industrial devices or electric power generation devices based on ECHONET Lite, reference numeral 2-1 designates an ECHONET Lite communication stack enabling ECHONET Lite communication, reference numeral 3 designates an ECHONET Lite network that performs communication based on an ECHONET Lite protocol, reference numeral 4 designates a controller that controls an ECHONET Lite device, and reference numeral 5 refers to a Modbus network that performs communication based on a Modbus protocol.

As illustrated in FIG. 1, since a communication protocol does not match between conventional devices based on a Modbus protocol and new devices based on the ECHONET Lite protocol, the conventional devices are incompatible with the new devices. Due to a problem of compatibility, it is difficult to realize connection and integration control between the conventional devices and the new devices.

In order to solve such a problem, the ECHONET consortium defines a ready device and an adaptor device as standard devices and is trying to distribute the ready device and the adaptor device. However, such a standard also has a problem of changing a protocol in order for conventional equipment to match the ready device.

Generally, a home energy management system (abbreviated as "HEMS" hereinafter) is a system that displays the amount of electric power consumed by devices (or home appliances) at home, or controls driving in a remote place.

Here, examples of a communication scheme (protocol) applied to the HEMS include ECHONET, ECHONET Lite, etc.

In a service based on ECHONET Lite, whenever a user of a terminal issues a request, information about all characteristics (or properties) of one or more devices is requested through a controller, and in response to the request, information about characteristic transmitted from each of the one or more devices is output through the terminal. For this reason, a communication load (traffic) between the terminal and the one or more devices increases, and a response time increases.

PATENT REFERENCE: Korean Patent No. 10-0628493

SUMMARY OF THE DISCLOSURE

Therefore, an object of the disclosure is to solve the problems of the related art and provide a protocol converter that converts protocols between a Modbus protocol and an ECHONET Lite protocol to enable communication between a device performing communication based on a Modbus protocol and a device performing communication based on an ECHONET Lite protocol.

Another object of the disclosure is to provide an ECHONET Lite terminal and a method of controlling the same, which provides (or outputs) information corresponding to a user request by using information, pre-stored in a database, of one or more devices included in a system that supports ECHONET Lite.

Another object of the disclosure is to provide an ECHONET Lite terminal and a method of controlling the same, in which even when a communication failure occurs between a terminal and a device, the terminal maintains the latest information, thereby providing information desired by a user of the terminal.

Still another object of the disclosure is to provide an ECHONET Lite terminal and a method of controlling the same, which provide failure-occurrence information through a terminal when a communication failure occurs between devices.

The one object of the disclosure is accomplished by providing a protocol converter according to the disclosure, the protocol converter comprising:

a first communicator connected to a first device that performs communication in a first protocol;

a second communicator connected to a second device that performs communication in a second protocol; and a controller configured to convert between the first protocol and the second protocol to control communication between the first device and the second device.

According to an aspect of the present invention, the first protocol may be a Modbus protocol, and the second protocol may be an ECHONET Lite protocol.

According to another aspect of the present invention, the first device may be an industrial device.

According to still another aspect of the present invention, the second device may be a controller, the controller is connected to at least one device that performs communication in the second protocol, and may control the at least one device.

According to still another aspect of the present invention, the first communicator may include an RS-485 interface module, and the second communicator may include one or more interface modules according to at least one of Ethernet, Wi-Fi, Zigbee, RF920, and RS232.

According to still another aspect of the present invention, the one or more interface modules of the second communicator may have an attachable/detachable configuration.

According to still another aspect of the present invention, when a signal is transmitted from the first device to the second device, the controller is configured to convert a signal, transmitted in the first protocol, into a signal based on the second protocol, and when a signal is transmitted from the second device to the first device, the controller is configured to convert a signal, transmitted in the second protocol, into a signal based on the first protocol.

According to still another aspect of the present invention, the controller comprises an application unit configured to perform communication between the first device and the second device; and a firmware unit that stores a driver for enabling the application unit to perform communication.

According to still another aspect of the present invention, the application unit comprises a master unit that communicates with the first device; and a middleware unit that communicates with the second device, the application unit communicating with each of the first device and the second device through the master unit and the middleware unit, wherein the application unit further comprises a conversion unit that converts the first protocol and the second protocol with each other, the application unit enabling communication between the first device and the second device through protocol conversion performed by the conversion unit.

According to still another aspect of the present invention, a terminal comprising:

a first communicator connected to a first device that performs communication in a first protocol;

a second communicator connected to a second device that performs communication in a second protocol;

a controller configured to convert between the first protocol and the second protocol to control communication between the first device and the second device; and a database that stores data elements for each device transmitted from each of one or more devices, wherein when a predetermined program is executed, the controller is configured to search for a state-changed data elements among data elements, stored in the database, of the one or more devices and performs a data access function based on a database query on the searched state-changed data elements to check changed values of the state-changed data elements.

According to still another aspect of the present invention, the terminal may further comprises a display unit that displays an object list including the data elements of the one or more devices.

According to still another aspect of the present invention, the object list may comprises a state-changed data elements and a state-unchanged data elements for each of a plurality of devices.

According to still another aspect of the present invention, when a detailed information request button or menu for a specific object or a specific data element of the object list displayed by the display unit is selected, the controller is configured to display detailed information of the specific object or the specific data element in the display unit.

According to still another aspect of the present invention, the controller is configured to communicate with one or more the devices in a background state, request information of a plurality of data elements, included in each of the one or more the devices, from each device, and updates the data elements stored in the database, based on the information of the plurality of data elements which is transmitted from each device in response to the request.

Further scope of applicability of the present application will become more apparent from the disclosure given hereinafter. However, it should be understood that the disclosure and specific examples, while indicating preferred embodiments of the disclosure, are given by way of illustration only, since various changes and modifications within the spirit and scope of the disclosure will become apparent to those skilled in the art from the disclosure.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Exemplary embodiments disclosed in the present invention may be applied to a Modbus to ECHONET Lite protocol converter. However, technology is not limited thereto, and exemplary embodiments disclosed in the present invention may be applied to communication modules, communication interfaces, communication drivers, surveillance and control devices, surveillance and control systems, plant control systems, home network systems, and/or the like in addition to all conventional communication devices and systems. Particularly, exemplary embodiments disclosed in the present invention may be usefully applied to a serial communication module and system using an RS-485/422 interface-based mode bus protocol which is mainly used for industrial communication.

The terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

The exemplary embodiments of the present invention will now be described with reference to the accompanying drawings, in which like numbers refer to like elements throughout.

In describing the present invention, if a detailed explanation for a related known function or construction is considered to unnecessarily divert the gist of the present invention, such explanation has been omitted but would be understood by those skilled in the art. The accompanying drawings of the present invention aim to facilitate understanding of the present invention and should not be construed as limited to the accompanying drawings.

Hereinafter, a protocol converter 50 disclosed in the present invention will be described with reference to the accompanying drawings.

Figure 2:
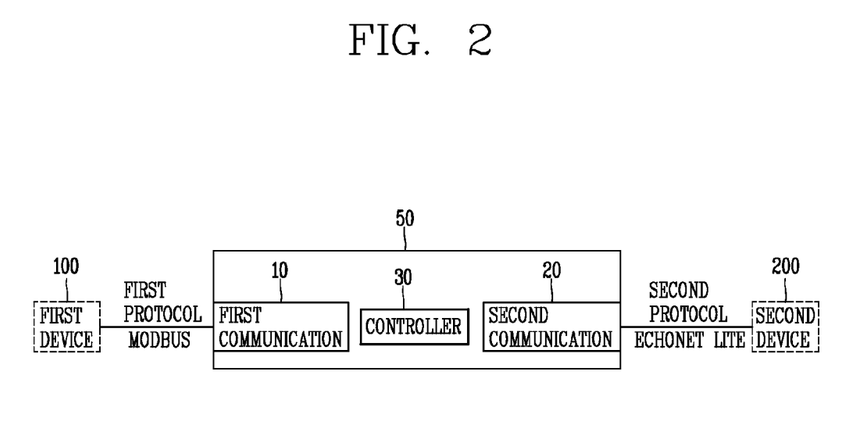
FIG. 2 is a block diagram illustrating a configuration of a protocol converter according to a preferred embodiment of the present invention.

As illustrated in FIG. 2, the protocol converter (hereinafter simply referred to as a converter) 50 comprises a first communicator 10 connected to a first device 100 which performs communication in a first protocol, a second communicator 20 connected to a second device 200 which performs communication in a second protocol, and a controller 30 that converts the first protocol and the second protocol with each other to control communication between the first device 100 and the second device 200.

The converter 50 may be a communication device that enables communication between two or more different or the same devices.

The converter 50 may convert one communication protocol or more communication protocols.

The converter 50 may be a communication device that converts a protocol of a received signal into a protocol of a transmission target device to enable communication between two or more different or the same devices.

The converter 50 may be a communication module or a communication card that is configured as one module.

The converter 50 may be a module included in the first device 100 or the second device 200.

The converter 50 may be a module attached to the outside of the first device 100 or the second device 200.

The first device 100 and the second device 200 connected to the converter 50 may respectively perform communication in the first protocol and the second protocol, and the converter 50 may convert the first protocol and the second protocol with each other.

The first protocol may be a Modbus protocol.

The second protocol may be an ECHONET Lite protocol.

The Modbus protocol may denote a serial communication protocol between a master and a slave.

The ECHONET Lite protocol may denote a communication protocol for a smart home sensor and a control network.

The first protocol that is the Modbus protocol may be used for communication between industrial devices.

The second protocol that is the ECHONET Lite protocol may be used for communication between home appliances.

The first device 100 may be an industrial device.

The first device 100 may be an industrial device that performs communication in the Modbus protocol.

For example, the first device 100 may be a electric power generator, a motor, large plant facilities including a substation, an industrial meter, an electricity meter (in other word "watt hour meter"), or the like.

The first device 100 may be connected to the first communicator 10 and may communicate with the converter 50. In this case, the first device 100 may transmit or receive a signal in the first protocol.

The second device 200 may be connected to at least one device that performs communication in the second protocol. Here, the second device 100 may be a controller that controls the at least one device.

The at least one device may be a home appliance that performs communication in the ECHONET Lite protocol.

Examples of the at least one device may include an emergency power system, a home meter (for example gas meter, heat meter), an electricity meter, and/or the like in addition to a television (TV), an audio device, a refrigerator, a washing machine, a telephone, and an illumination device that are smart home appliances.

The second device 200 may be connected to the at least one device and may communicate with the at least one device. In this case, the second device 200 may transmit or receive a signal in the second protocol.

The second device 200 may be connected to the at least one device and may control the at least one device by itself.

The second device 200 may be connected to the second communicator 20 and may communicate with the converter 50. In this case, the second device 200 may transmit or receive a signal in the second protocol.

The first device 100 and the second device 200 may be respectively connected to the first communicator 10 and the second communicator 20 which are included in the converter 50, and may respectively transmit or receive a signal through the first communicator 10 and the second communicator 20.

Figure 3:
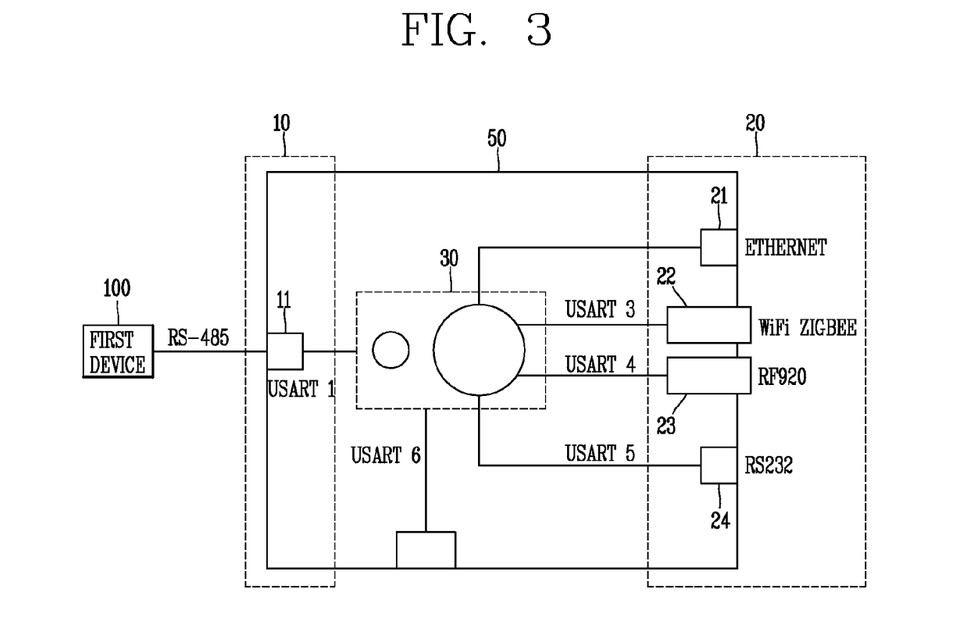
FIG. 3 is a block diagram illustrating a more detailed configuration of a protocol converter according to a preferred embodiment of the present invention.

Each of the first communicator 10 and the second communicator 20 of the converter 50 may have a configuration illustrated in FIG. 3.

Each of the first communicator 10 and the second communicator 20, as illustrated in FIG. 3, may include an interface module connected to each of the first device 100 and the second device 200.

The interface module may be a connection unit that connects the converter 50 to the first device 100 and the second device 200 through communication.

The interface module may be differently configured depending on the kind of a communication protocol.

The interface module may be an interface module that enables wired communication or wireless communication.

The interface module may be a module which is built into each of the first communicator 10 and the second communicator 20.

The interface module may be a module which is provided outside the first communicator 10 and the second communicator 20.

The first communicator 10 may include an RS-485 interface module 11.

That is, the first device 100 may be connected to the first communicator 10 through the RS-485 interface module 11 and may communicate with the converter 50 according to a signal protocol of the RS-485 interface module 11.

The second communicator 20 may include one or more interface modules 21 to 24 according to at least one communication mode among Ethernet, Wi-Fi, Zigbee, RF920, and RS232.

That is, the second device 200 may be connected to the second communicator 20 through the one or more interface modules 21 to 24 according to at least one communication mode among Ethernet, Wi-Fi, Zigbee, RF920, and RS232 and may communicate with the converter 50 according to a signal standard of the one or more interface modules 21 to 24.

The one or more interface modules 21 to 24 of the second communicator 20 may be implemented as an attachable/detachable type.

That is, the one or more interface modules 21 to 24 may be detachably attached to the second communicator 20, and thus, each of the one or more interface modules 21 to 24 may be replaced with the other interface module.

The first communicator 10 including each of the one or more interface modules 21 to 24 may receive a signal through communication with the first device 100 and may transfer the signal to the controller 30, thereby enabling a protocol to be changed in the controller 30. The second communicator 20 including each of the one or more interface modules 21 to 24 may receive a signal through communication with the second device 200 and may transfer the signal to the controller 30, thereby enabling a protocol to be changed in the controller 30.

The first communicator 10 may transfer a signal, transmitted from the first device 100, to the controller 30 and may also transmit a signal, transferred from the controller 30, to the first device 100.

The first communicator 10 may transfer a signal based on the first protocol, transmitted from the first device 100, to the controller 30 to allow the controller 30 to convert the first protocol of the signal into the second protocol.

The second communicator 20 may transfer a signal, transmitted from the second device 200, to the controller 30 and may also transmit a signal, transferred from the controller 30, to the second device 200.

The second communicator 20 may transfer a signal based on the second protocol, transmitted from the second device 200, to the controller 30 to allow the controller 30 to convert the second protocol of the signal into the first protocol.

The controller 30 may receive a signal from the first device 100, which performs communication in the first protocol, through the first communicator 10 connected to the first device 100. Also, the controller 30 may receive a signal from the second device 200, which performs communication in the second protocol, through the second communicator 20 connected to the second device 200.

The controller 30 may transmit a signal to the first device 100 through the first communicator 10. Also, the controller 30 may transmit a signal to the second device 200 through the second communicator 20.

The controller 30 may convert a signal, transmitted from the first device 100 that performs communication in the first protocol, into a signal based on the second protocol.

The controller 30 may convert a signal, transmitted from the second device 200 that performs communication in the second protocol, into a signal based on the first protocol.

The controller 30 may convert the first protocol and the second protocol with each other and may transmit a signal based on the converted protocol to each of the first device 100 and the second device 200.

That is, the controller 30 may convert between the first protocol and the second protocol, thereby enabling a signal to be transmitted or received between the first device 100 and the second device 200.

When a signal is transmitted from the first device 100 to the second device 200, the controller 30 may convert a signal, transmitted in the first protocol, into a signal based on the second protocol. Also, when a signal is transmitted from the second device 200 to the first device 100, the controller 30 may convert a signal, transmitted in the second protocol, into a signal based on the first protocol.

For example, when the first device 100 that is an electricity meter transmits meter-read data to the second device 200 that is controller, the first device 100 may transmit the meter-read data to the first communicator 10 as a signal based on the first protocol, and the controller 30 may receive the signal transmitted to the first communicator 10, convert the received signal into a signal based on the second protocol, and transfer the signal based on the second protocol to the second communicator 20, thereby allowing the meter-read data to be transmitted to the second device 200 through the second communicator 20.

Alternatively, when the second device 200 that is controller transmits an operation control command signal to the first device 100 that is a motor, the second device 200 may transmit the operation control command signal to the second communicator 20 as a signal based on the second protocol, and the controller 30 may receive the signal transmitted to the second communicator 20, convert the received signal into a signal based on the first protocol, and transfer the signal based on the first protocol to the first communicator 10, thereby allowing the operation control command signal to be transmitted to the first device 100 through the first communicator 10.

Figure 4:
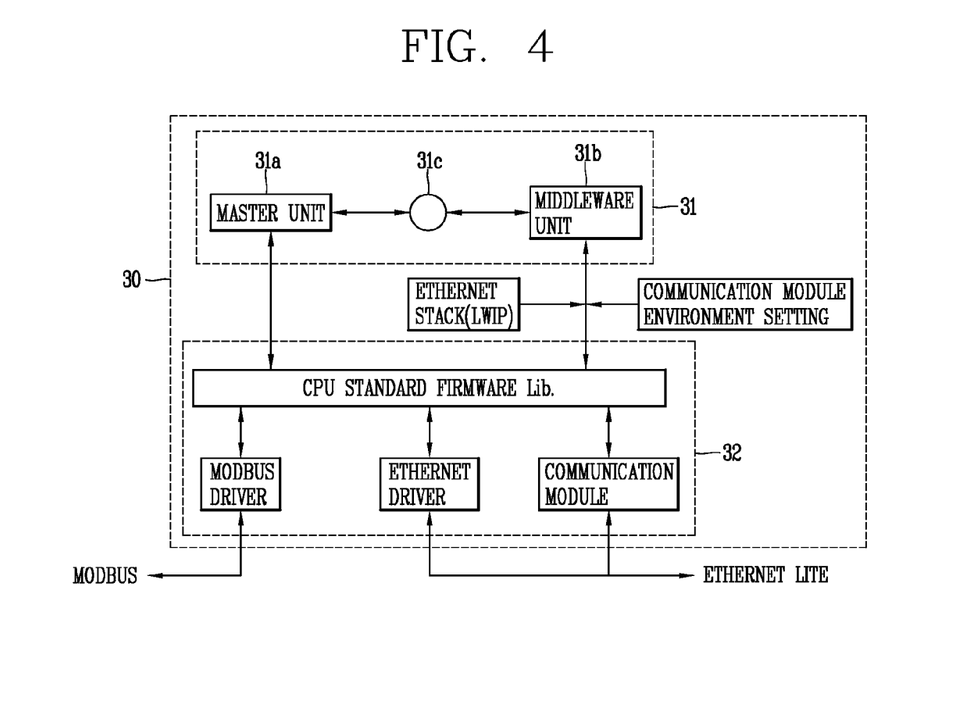
FIG. 4 is a block diagram illustrating a detailed configuration of a controller included in a protocol converter according to a preferred embodiment of the present invention.

The controller 30 may include elements illustrated in FIG. 4.

The controller 30, as illustrated in FIG. 4, comprise an application unit 31, which performs communication between the first device 100 and the second device 200, and a firmware unit 32 that stores a driver for enabling the application unit 31 to perform communication.

Each of the application unit 31 and the firmware unit 32 may be a circuit that stores data, performs an arithmetic operation, and performs processing.

Moreover, each of the application unit 31 and the firmware unit 32 may be a circuit that comprises a semiconductor device and a memory. The application unit 31 may store an application and the firmware for performing an operation of the converter 50.

The application unit 31 may be a unit that stores an application for the converter 50 that performs communication between the first device 100 and the second device 200, and executes the application.

The firmware unit 32 may store a driver for each of the first communicator 10 and the second communicator 20, a communication module driver for an interface module included in each of the first communicator 10 and the second communicator 20, and a driver that enables conversion between the first protocol and the second protocol.

The application unit 31 may communicate with each of the first communicator 100 and the second communicator 200.

Moreover, the application unit 31 may include a master unit 31a, which communicates with the first device 100, and a middleware unit 31b that communicates with the second device 200. The application unit 31 may communicate with each of the first device 100 and the second device 200 through the master unit 31a and the middleware unit 31b.

The master unit 31a may be connected to an interface module included in the first communicator 10 and may communicate with the first device 100 through the first communicator 10. The middleware unit 31b may be connected to an interface module included in the second communicator 20 and may communicate with the second device 200 through the second communicator 20.

Moreover, the master unit 31a may transmit or receive a signal to or from the first communicator 10 through the driver that is included in the firmware unit 32 and enables a signal to be transmitted or received to or from the interface module included in the first communicator 10.

Moreover, the master unit 31a may periodically communicate with the first device 100 to generate information about the first device 100, based on a signal received from the first device 100.

The controller 30 may update the driver included in the firmware unit 32, based on the information generated by the master unit 31a.

That is, the master unit 31a may periodically communicate with the first device 100 to generate information for communication with the first device 100, and thus, the driver included in the firmware unit 32 may be updated, thereby maintaining communication with the first device 100.

Moreover, the middleware unit 31b may transmit or receive a signal to or from the second communicator 20 through the driver that is included in the firmware unit 32 and enables a signal to be transmitted or received to or from the interface module included in the second communicator 20.

The application unit 31 may further comprise a conversion unit 31c that converts the first protocol and the second protocol with each other. The application unit 31 may enable communication between the first device 100 and the second device 200 through protocol conversion performed by the conversion unit 31c.

The conversion unit 31c may convert the first protocol and the second protocol with each other by using the driver that is included in the firmware unit 32.

The controller 30 may further include a communication stack that enables communication with the second device 200.

Moreover, the controller 30 may change a setting according to a command signal input from the outside of the converter 50.

For example, when communication should be performed by using a specific module among the one or more interface modules included in the second communicator 20, a setting change command signal for changing an environment setting of the middleware unit 31b may be input from the outside, and thus, a setting of the middleware unit 31b and a setting of the driver included in the firmware unit 32 may be changed according to the setting change command signal.

Figure 5:
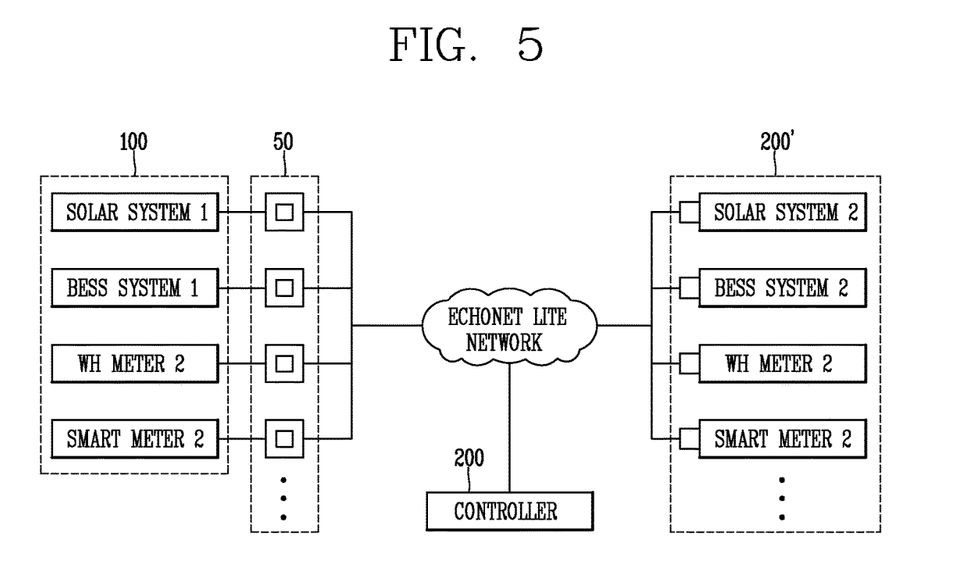
FIG. 5 is a block diagram illustrating a configuration of a system including a protocol converter according to a preferred embodiment of the present invention, a plurality of devices, and an ECHONET Lite network.

The converter 50 may be embodied as an embodiment illustrated in FIG. 5.

In the embodiment to which the converter 50 is applied, as illustrated in FIG. 5, the plurality of converters 50 may be connected to a plurality of the first devices 100 correspondingly, and one or more the converters 50 may be connected to the one second device 200'.

That is, when the second device 200' is the only controller, a plurality of the converters 50 and a plurality of the first devices 100 may be connected to one the second device 200', and the plurality of first devices 100 may be controlled by the second device 200' only.

The second device 200 may be connected to at least one device 200' that performs communication in the second protocol, and thus, a second protocol network may be provided.

The second protocol may be the ECHONET Lite protocol.

The at least one device 200' may comprise a protocol converter, a signal amplifier, and a signal processing module or a communication module which is capable of being connected to the second protocol network.

Moreover, the first device 100 may be included in an ECHONET Lite network that is connected with the second device 200', and thus may communicate with the second device 200' in the second protocol through the converter 50.

Moreover, a single converter 50 may be connected commonly to a plurality of the first devices 100.

That is, a plurality of the first devices 100 may be connected to the single converter 50 and may communicate with the second device 200' through the single converter 50.

A configuration and an operation of a terminal, including the converter described above with reference to FIGS. 6 to 8, according to a preferred embodiment of the present invention will be described below.

Figure 6:
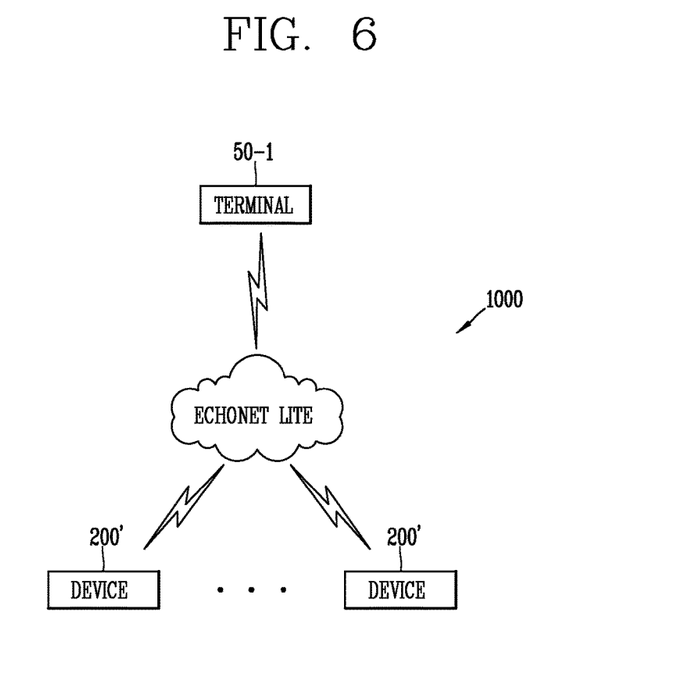
FIG. 6 is a block diagram illustrating a configuration of a system including a terminal having a protocol converter according to a preferred embodiment of the present invention, a plurality of devices, and an ECHONET Lite network.

FIG. 6 is a block diagram illustrating a configuration of a Home Energy Management System (abbreviated as "HEMS" hereinafter) 1000 according to a preferred embodiment of the present invention.

As illustrated in FIG. 6, the HEMS 1000 may comprise a terminal 50-1 and one or more devices 200'. All the elements the HEMS 1000 illustrated in FIG. 6 are not essential elements, and the HEMS 1000 may comprise more elements than the number of the elements illustrated in FIG. 6. Alternatively, the HEMS 1000 may comprise less elements than the number of the elements illustrated in FIG. 6.

Figure 7:
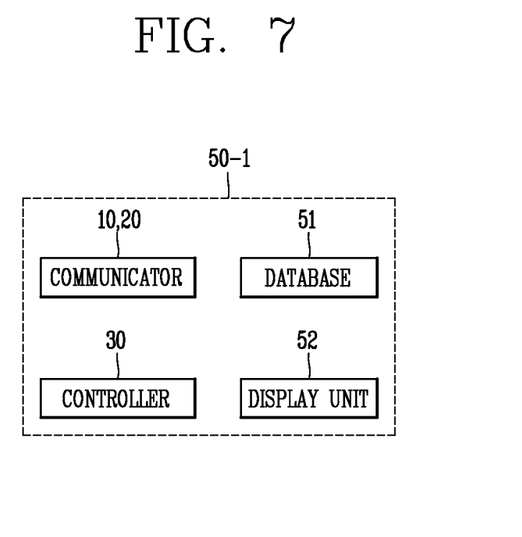
FIG. 7 is a block diagram illustrating a configuration of a terminal according to another embodiment of the present invention.

As illustrated in FIG. 7, a terminal 50-1 may comprise a plurality of communicators 10 and 20, a database 51, a controller 30, and a display unit 52. All the elements the terminal 50-1 illustrated in FIG. 7 are not essential elements, and the terminal 50-1 may comprise more elements than the number of the elements illustrated in FIG. 7. Alternatively, the terminal 50-1 may comprise less elements than the number of the elements illustrated in FIG. 7.

The plurality of communicators 10 and 20 may include a first communicator 10 and a second communicator 20. The second communicator 20 may communicate with the device 200' according to an ECHONET Lite protocol.

The first communicator 10 may communicate with the first device (can refer to the reference numeral 100 in FIG. 2) according to a Modbus protocol.

Moreover, the plurality of communicators 10 and 20 may communicate with an internal arbitrary element or at least one arbitrary second device (can refer to the device designated by the reference numeral 200' in FIG. 6) through a wired or wireless communication network. Here, wired Internet medium may include Wireless Local Area Network (abbreviated as WLAN), Wireless Broadband (abbreviated as Wibro), World Interoperability for Microwave Access (abbreviated as Wimax), High Speed Downlink Packet Access (abbreviated as HSDPA), IEEE 802.16, Long Term Evolution (abbreviated as LTE), Wireless Mobile Broadband Service (abbreviated as WMBS), and/or the like. Also, short-range communication medium may include Bluetooth, Wi-Fi, Radio Frequency Identification (abbreviated as RFID), infrared data association (abbreviated as IrDA), Ultra Wide Band (abbreviated as UWB), Zigbee, Wi-Sun, Near Field Communication (abbreviated as NFC), Ultra Sound Communication (abbreviated as USC), Visible Light Communication (abbreviated as VLC), and/or the like. Also, wired communication medium may include Power Line Communication (abbreviated as PLC), USB communication, Ethernet, serial communication, optical fiber cable, coaxial cable, and/or the like.

Moreover, the communicators 10 and 20 may receive one or more (or a plurality of) data elements (or a values of a corresponding data elements) transmitted from the device 200'.

Moreover, the communicators 10 and 20 may communicate with one or more the devices 200' in a background state according to control by the controller 30. Here, the background state may be for example a state where when electric power is supplied to the terminal 50-1, instead of execution that is made in response to a selection or a request of a user, automatic execution is made by an automatic execution program irrespective of other execution operation.

Moreover, the communicators 10 and 20 may receive one or more (a plurality of) data elements (or a values of a corresponding data elements) transmitted from one or more the devices 200' in the background state according to control by the controller 30.

The database (or a storage) 51 may store various interfaces such as a User Interface (abbreviated as UI), a Graphic User Interface (abbreviated as GUI), and/or the like.

Moreover, the database 51 may store data, program, and/or the like necessary for an operation of the terminal 50-1.

Moreover, the database 51 may comprise at least one storage medium of a flash memory type, a hard disk type, a multimedia card micro type, a card type memory (for example, an SD or XD memory or the like), a magnetic memory, a magnetic disk, an optical disk, a Random Access Memory (RAM), a Static Random Access Memory (SRAM), a Read-Only Memory (ROM), an Electrically Erasable Programmable Read-Only Memory (EEPROM), a Programmable Read-Only Memory (PROM), etc. Also, the terminal 50-1 may operate a web storage that performs a storing function of the database 51 on the Internet, or may operate in association with the web storage.

Moreover, the database 51 may store a data elements (or characteristic, information, data, and/o the like) of one or more the devices 200' included in the HEMS 1000 supporting ECHONET Lite.

Moreover, the database 51 may update a plurality of pre-stored data elements for each of the one or more devices 200' according to control by the controller 30.

The controller 3-0 may perform an overall control function of the terminal 50-1.

Moreover, when a predetermined program is executed (or when a predetermined button or menu is selected or clicked), the controller 30 may search (or check) for a state-changed data elements (or a value-changed data elements) among data elements (or characteristic, information, data, and/o the like), stored in the database 51, in relation with the one or more devices 200' included in the HEMS 1000 supporting ECHONET Lite.

Moreover, the controller 30 may perform a data access function such as a database query on the searched (or checked) state-changed data elements to check a changed data elements (or characteristic) value of the state-changed data elements.

Moreover, the controller 30 may display an object list in the display unit 52. Here, the object list may include data elements of one or more the second devices 200' and may also include a state-changed data elements and a state-unchanged data elements for each device 200'.

Moreover, when a detailed information request for a specific object (or a specific device or a specific data elements) included in the object list displayed by the display unit 52 is received according to a control (or manipulation, touch, selection, or the like) of a user, the controller 30 may control the display unit 52 for displaying detailed information of the specific object.

Moreover, the controller 30 may communicate with the one or more devices 200' through the communicators 10 and 20 in the background state.

Moreover, the controller 30 may request information of a plurality of data elements, included in each of the one or more devices 200', from a corresponding device 200' through the communicators 10 and 20 in the background state.

Moreover, the controller 30 may respond to the request through the communicators 10 and 20 in the background state to receive information, transmitted from the corresponding device 200, of a plurality of data elements for each device 200'.

Moreover, the controller 30 may update the data elements of the corresponding device 200' stored in the database 51, based on the received information of the data elements of the corresponding device 200'.

The display unit 52 may display various content such as various menu screens by using a UI and/or a GUI stored in the database 51 according to control by the controller 30. Here, the various content displayed by the display unit 52 may include a menu screen such as various texts or image data (including various kind of information data), an icon, a list menu, a combo box, and/or the like. Also, the display unit 52 may be a touch screen.

Moreover, the display unit 52 may include at least one of a Liquid Crystal Display (LCD), a Thin Film Transistor LCD (TFT LCD), an Organic Light Emitting Diode (OLED), a flexible display, a three-Dimensional (3D) display, an e-ink display, a Light Emitting Diode (LED), etc.

Moreover, the display unit 52 may display an object list, stored in the database 51, for a plurality of the devices 200' according to control by the controller 30. Here, the object list may include data elements of one or more the devices 200' and may also include a state-changed data elements and a state-unchanged data elements for each device 200'. In this case, the display unit 52 may display the state-changed data elements and the state-unchanged data elements in different fonts, letter sizes, letter colors, background colors, and/or the like to be distinguished from each other.

Moreover, the display unit 52 may display detailed information of a specific object, a specific device, and a specific data elements according to control by the controller 30.

The device (or another terminal) 200' may be a home appliance included in the HEMS 1000.

Moreover, the device 200' may transmit, to the terminal 50-1, information (or a value) of a plurality of (or one or more) data elements in the device 200'. In this case, the device 200' may transmit the plurality of data elements (or information of the plurality of data elements) to the terminal 50-1 that operates in the background state.

As described above, information corresponding to a user request may be provided (or output) based on information, stored in a database, of one or more devices included in a system supporting ECHONET Lite.

Moreover, as described above, even when a communication failure occurs between a terminal and a device, the terminal maintains the latest information, thereby providing information desired by a user of the terminal.

Moreover, as described above, when a failure occurs between devices, failure-related information may be provided through a terminal.

Hereinafter, a method of controlling an ECHONET Lite terminal according to a preferred embodiment of the present invention will be described in detail with reference to FIGS. 6 to 8.

Figure 8:
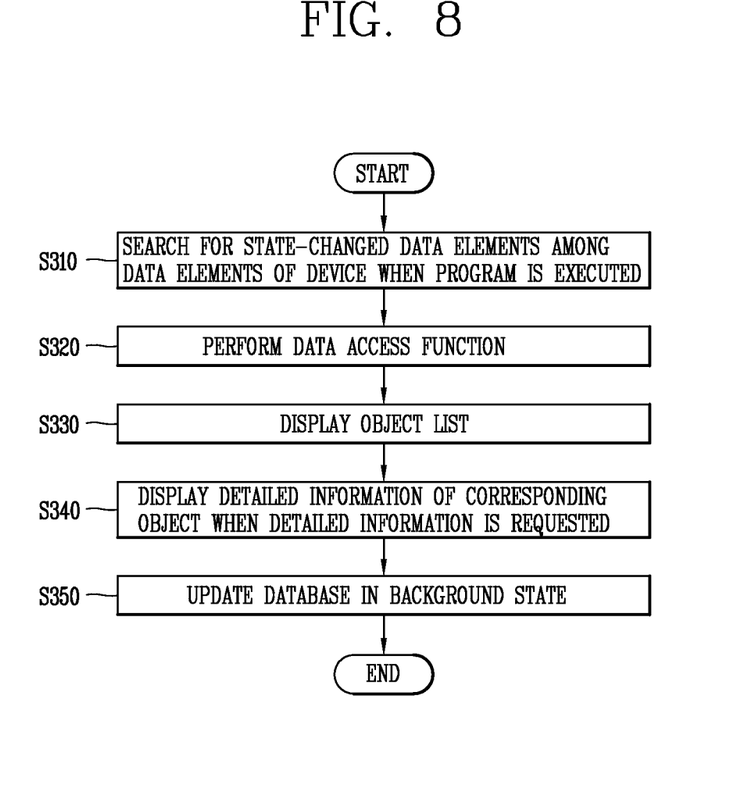
FIG. 8 is a flowchart illustrating a method of controlling a terminal according to another embodiment of the present invention.

FIG. 8 is a flowchart illustrating a method of controlling an ECHONET Lite terminal according to another exemplary embodiment of the present invention.

First, when a predetermined program is executed, the controller 30 may search (or check) for a state-changed data elements (or a value-changed data elements) among data elements (or characteristic, information, data, and/o the like), stored in the database 51, of the one or more devices 200' included in the HEMS 1000 supporting ECHONET Lite.

For example, in step S310, when the predetermined program is executed, the controller 30 may search for a state-changed data elements among data elements of each of a first device, a second device, and a third device which are included in the HEMS 1000.

Subsequently, the controller 30 may perform the data access function such as the database query on the searched (or checked) state-changed data elements to check a changed value of the state-changed data elements (or characteristics).

For example, in operation S320, when each of states of an eleventh data elements and a twelfth data elements of the first device and a state of a twenty-first data elements of the second device is a changed state, the controller 30 may perform the data access function such as the database query to check values of the state-changed eleventh data elements and twelfth data elements of the first device and a value of the state-changed twenty-first data elements of the second device.

Subsequently, the controller 30 may display an object list in the display unit 52. Here, the object list may include data elements of one or more the devices 200' and may also include a state-changed data elements and a state-unchanged data elements for each device 200'.

For example, in step S330, the controller 30 may display, in the display unit 52, the object list including a plurality data elements of each of the first device, the second device, and the third device. In this case, the object list may include the state-changed eleventh data elements and twelfth data elements of the first device, a state-unchanged thirteenth data elements and fourteenth data elements of the first device, the state-changed twenty-first data elements of the second device, a state-unchanged twenty-second data elements and twenty-third data elements of the second device, and a state-unchanged thirty-first data elements, thirty-second data elements, and thirty-third data elements of the third device.

Subsequently, when a detailed information request for a specific object (or a specific device or a specific data elements) included in the object list displayed by the display unit 52 is received according to a control (or manipulation, touch, selection, or the like) of a user of the terminal 50-1, the controller 30 may display detailed information of the specific object in the display unit 52.

For example, when a detailed information request button (or menu) for the second device is selected while the object list including the plurality data elements of each of the first device, the second device, and the third device is being displayed by the display unit 52, the controller 30 may display detailed information of the second device in the display unit 52.

As another example, in operation step S340, when a detailed information request button (or menu) for the eleventh data elements included in the first device is selected while the object list including the plurality data elements of each of the first device, the second device, and the third device is being displayed by the display unit 52, the controller 30 may display detailed information of the eleventh data elements in the display unit 52.

Subsequently, while the operation steps (for example, steps S310 to S340) are being performed, the controller 30 may communicate with one or more the devices 200' in the background state, may request, from a corresponding deice 200', information about a plurality of data elements included in each of the one or more devices 200', and may update the data elements (or data elements of each device) of the corresponding device 200' stored in the database 51, based on information of the data elements of the corresponding device 200' which is transmitted from the corresponding device 200' in response to the request.

For example, in step S350, while the operations (for example, operations S310 to S340) are being performed, the controller 30 may communicate with one or more the devices 200' in the background state, may request, from the first device, information (or a data elements value) of the eleventh to fourteenth data elements included in the first device, and may update the data elements of the first device stored in the database 51, based on the information of the eleventh to fourteenth data elements which is transmitted from the first device in response to the request.

Exemplary embodiments of the protocol converter disclosed in the present invention may be applied to communication modules, communication interfaces, communication drivers, and/or the like in addition to communication devices and systems.

Exemplary embodiments disclosed in the present invention may be applied to supervisory and control devices, supervisory and control systems, plant control systems, home network systems, and/or the like.

Exemplary embodiments disclosed in the present invention may be usefully applied to a serial communication module or a serial communication system using an RS-485/422 interface-based mode bus protocol which is mainly used for industrial communication.

The protocol converter disclosed according to the present invention enables communication between a device, which performs communication in the Modbus protocol, and a device that performs communication in an ECHONET Lite protocol, and thus, conventional devices using the Modbus protocol is compatible with devices using the ECHONET Lite protocol.

The protocol converter disclosed according to the present invention enables communication between a device, which performs communication in the Modbus protocol, and a device that performs communication in an ECHONET Lite protocol, and thus, conventional devices using the Modbus protocol and devices using the ECHONET Lite protocol are controlled by only one controller.

The protocol converter disclosed according to the present invention enables communication between a device, which performs communication in the Modbus protocol, and a device that performs communication in an ECHONET Lite protocol, and thus is variously used and appropriately operated for an industrial device and a home appliance.

The protocol converter disclosed according to the present invention enables communication between a device, which performs communication in the Modbus protocol, and a device that performs communication in an ECHONET Lite protocol, and thus, the availability of devices using the ECHONET Lite protocol increases.

The protocol converter disclosed according to the present invention enables communication between a device, which performs communication in the Modbus protocol, and a device that performs communication in an ECHONET Lite protocol, and thus, the availability of devices using the ECHONET Lite protocol increases, leading to the development of the ECHONET Lite protocol and devices using the same.

The ECHONET Lite type terminal and the method of controlling the same according to the exemplary embodiments of the present invention provide (or output) information corresponding to a user request by using information, pre-stored in the database, of one or more devices included in a system supporting ECHONET Lite, and thus, information stored in a storage is provided to a user of a corresponding terminal, thereby more enhancing a response time than a case of accessing a device core to collect information.

Moreover, in the ECHONET Lite type terminal and the method of controlling the same according to the exemplary embodiments of the present invention, even when a communication failure occurs between a terminal and a device, the terminal maintains the latest information, thereby providing information desired by a user of the terminal. Accordingly, the convenience of users is enhanced.

Moreover, the ECHONET Lite type terminal and the method of controlling the same according to the exemplary embodiments of the present invention provide failure-related information through a terminal when a failure occurs between devices, and thus quickly inform a user of a failure situation.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A terminal comprising:
   a first communicator connected to a first device that performs communication in a first protocol;
   a second communicator connected to at least one second device that performs communication in a second protocol;
   a controller that converts the first protocol and the second protocol with each other to control communication between the first device and the at least one second device;
   a database that stores data elements for each device, wherein the data elements are received from each of one or more devices; and
   a display unit that displays an object list including the data elements of the one or more devices,
   wherein when a predetermined program is executed, the controller searches for state-changed data elements among data elements stored in the database of the at least one second device and performs a data access function based on a database query on the searched state-changed data elements to check changed values of the state-changed data elements, and
   wherein even when a communication failure between the terminal and the at least one second device occurs, the database provides the data elements pre-stored in the database via the display unit in response to a user request,
   wherein the controller is configured to:
      communicate with one or more of the devices in a background state;
      request information of a plurality of data elements included in each of the one or more of the devices; and
      update the data elements stored in the database based on information of the plurality of data elements received from each of the one or more of the devices in response to the request,
   wherein the background state is a state where, instead of execution that is made in response to a selection or a request of a user, automatic execution is made by an automatic execution program,
   wherein the first communicator communicates with the first device according to a Modbus protocol and the second communicator communicates with the at least one second device according to an ECHONET Lite protocol, and
   wherein the object list includes data elements of the at least one second device and includes the state-changed data elements and state-unchanged data elements for each device.

2. The terminal of claim 1, wherein when a detailed information request button or menu for a specific object or a specific data element of the object list displayed by the display unit is selected, the controller is configured to display detailed information of the specific object or the specific data element in the display unit.

* * * * *